US012126242B2

(12) United States Patent
Kaiser et al.

(10) Patent No.: US 12,126,242 B2
(45) Date of Patent: Oct. 22, 2024

(54) MOTOR STATOR COOLANT DISTRIBUTION VIA INTERNAL CHANNELS

(71) Applicant: GM GLOBAL TECHNOLOGY OPERATIONS LLC, Detroit, MI (US)

(72) Inventors: Edward L. Kaiser, Orion, MI (US); Paul Buchholz, Warren, MI (US); Cheongun Han, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 346 days.

(21) Appl. No.: 17/578,722

(22) Filed: Jan. 19, 2022

(65) Prior Publication Data
US 2023/0231437 A1  Jul. 20, 2023

(51) Int. Cl.
  *H02K 1/16*  (2006.01)
  *H02K 1/20*  (2006.01)
  (Continued)

(52) U.S. Cl.
  CPC ............. *H02K 5/203* (2021.01); *H02K 1/16* (2013.01); *H02K 1/20* (2013.01); *H02K 9/19* (2013.01); *H02K 15/02* (2013.01)

(58) Field of Classification Search
  CPC .......... H02K 5/203; H02K 1/16; H02K 1/20; H02K 9/19; H02K 15/02; H02K 5/20;
  (Continued)

(56) References Cited

U.S. PATENT DOCUMENTS 5,091,612 A * 2/1992 Van Fossen ......... H01H 35/405
                                                340/610
11,218,050 B2   1/2022 Leong et al.
                     (Continued)

FOREIGN PATENT DOCUMENTS

JP    2019080365 A  *  5/2019  ............... H02K 1/20
KR    20020089415 A *  9/2002  ............... H02K 1/18
WO   WO-2012003208 A2 * 1/2012  ............... H02K 1/20

OTHER PUBLICATIONS

WO 2012003208 A2 PE2E translation (Year: 2012).*
JP2019080365A translation by espacenet.com (Year: 2019).*

*Primary Examiner* — Michael Andrews
*Assistant Examiner* — Selim R Zoorob
(74) *Attorney, Agent, or Firm* — Quinn IP Law

(57) ABSTRACT

A motor stator includes a plurality of stacked annular stator laminates defining a stator core having an inner circumference, an outer circumference, a plurality of stator teeth on the inner circumference, and a plurality of ears extending outward from the outer circumference with a respective bolt hole defined in each ear. A first set of the stator laminates includes a plurality of coolant openings therethrough, wherein the coolant openings of adjacent stator laminates communicate with one another in order to define cooling channels inside the stator core. A second set of the stator laminates each include one or more generally radially extending first openings therethrough, wherein the first openings of adjacent stator laminates communicate with one another to define one or more first radial channel segments inside the stator core for providing radial coolant flow between one or more bolt holes and one or more cooling channels.

18 Claims, 10 Drawing Sheets

(51) Int. Cl.
*H02K 5/20* (2006.01)
*H02K 9/19* (2006.01)
*H02K 15/02* (2006.01)

(58) Field of Classification Search
CPC ........ H02K 1/193; H02K 1/197; H02K 1/165; H02K 1/18; H02K 1/185
USPC ................. 310/54, 58, 59, 216.015, 216.016
See application file for complete search history.

(56) References Cited

U.S. PATENT DOCUMENTS

| | | | |
|---|---|---|---|
| 2006/0170298 A1* | 8/2006 | Edrington | H02K 5/124 310/90 |
| 2017/0310189 A1* | 10/2017 | Hanumalagutti | H02K 5/203 310/54 |
| 2020/0389064 A1* | 12/2020 | Leong et al. | H02K 5/203 310/54 |

* cited by examiner

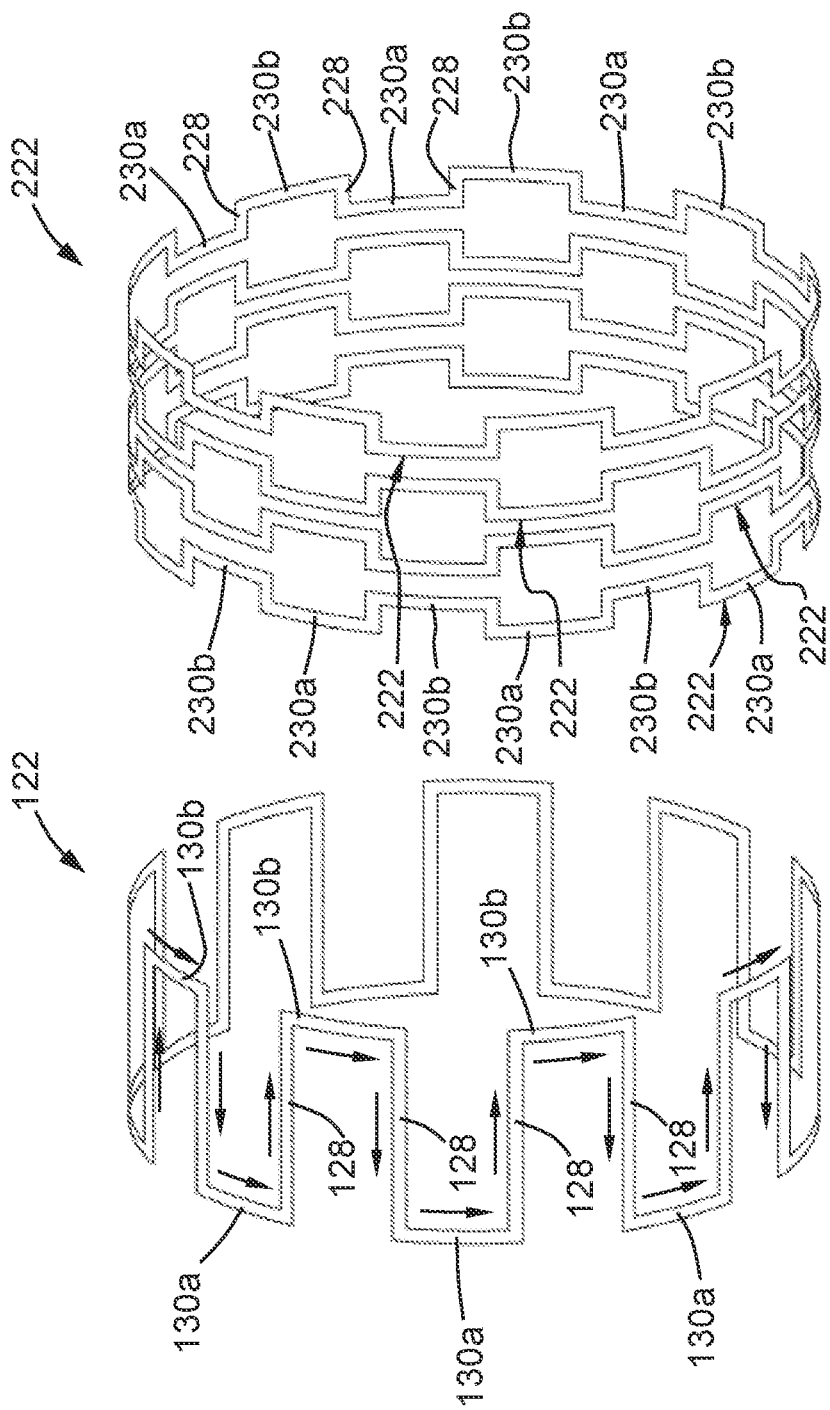

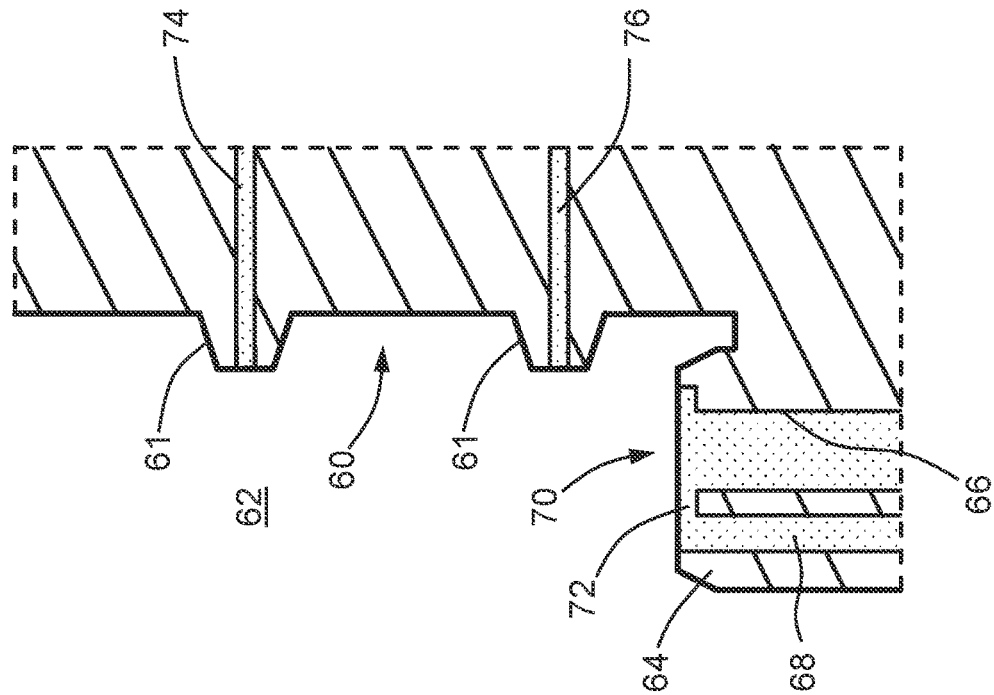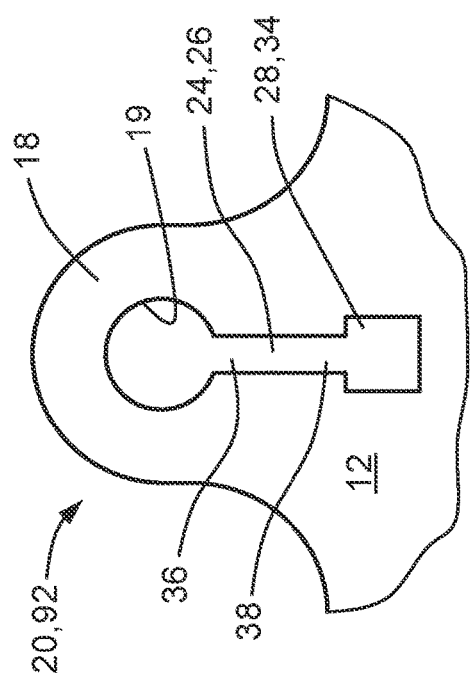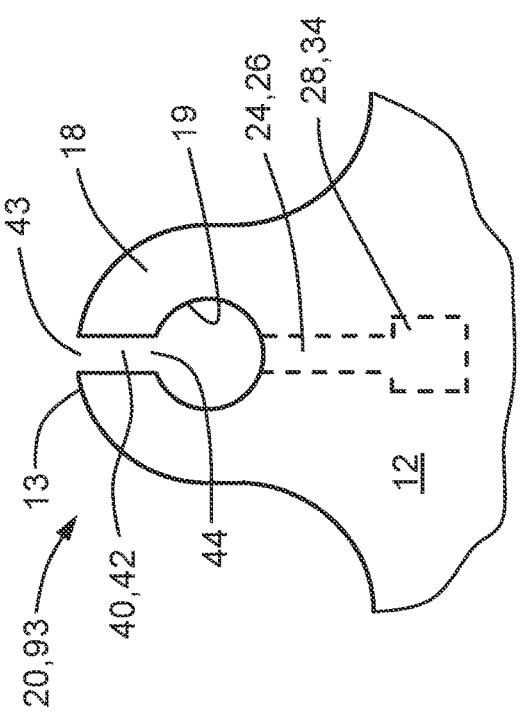

MOTOR STATOR COOLANT DISTRIBUTION VIA INTERNAL CHANNELS

INTRODUCTION

This disclosure relates to cooling electric motor stators by distribution of coolant via internal channels within the stator.

Electric motors are commonly used in vehicle propulsion systems and in other industrial applications. One of the goals in the design and manufacture of electric motors is to improve cooling characteristics of the windings and the stator core, in order to avoid overheating of the stator which can decrease the efficiency of the electric motor and can degrade the motor's performance.

SUMMARY

According to one embodiment, a motor stator, includes a plurality of stacked annular stator laminates defining a stator core having an inner circumference, an outer circumference, a plurality of stator teeth on the inner circumference, and a plurality of ears extending outward from the outer circumference with a respective bolt hole defined in each of the plurality of ears. A first set of the plurality of stator laminates include a plurality of coolant openings therethrough, wherein the plurality of coolant openings of adjacent stator laminates communicate with one another in order to define cooling channels inside the stator core. Additionally, a second set of the plurality of stator laminates each include one or more generally radially extending first openings therethrough, wherein the first openings of adjacent stator laminates communicate with one another to define one or more first radial channel segments inside the stator core for providing radial coolant flow between one or more of the bolt holes and one or more of the cooling channels.

The motor stator may also include one or more bolts, wherein each of the one or more bolts is configured to extend through a respective one of the bolt holes. A respective spacing may be provided between a respective bolt shank of each of the one or more bolts and a respective inner surface of the respective one of the bolt holes, thereby defining a respective tubular-shaped axial distribution channel about each of the one or more bolts when inserted into the respective one of the bolt holes.

The motor stator may additionally include a motor case having an interior and a plurality of mounting bosses within the interior. Each of the plurality of mounting bosses may have a respective threaded hole therein and may be configured to receive a respective one of the plurality of ears thereon. The motor case may have a respective internal coolant channel therewithin proximate at least one of the mounting bosses, wherein each of the at least one of the mounting bosses may have a respective counterbore formed therein about the respective threaded hole, wherein each respective counterbore is in fluid communication with the respective internal coolant channel.

Each of the one or more first radial channel segments may have a respective first end in fluid communication with a respective one of the bolt holes and a respective second end in fluid communication with a respective one of the cooling channels. A third set of the plurality of stator laminates may include one or more generally radially extending second openings which define one or more second radial channel segments for providing coolant flow between an outer edge of one of the plurality of ears and the respective bolt hole defined in the ear.

The plurality of stator laminates may include a first stator laminate at a first end face of the stator core and a last stator laminate at a second end face of the stator core opposed to the first end face. At least one of the first and last stator laminates may have a respective orifice opening therethrough in fluid communication with at least one of the bolt holes or with one of the cooling channels.

A fourth set of the plurality of stator laminates may include the plurality of coolant openings including a plurality of generally circumferentially extending slots, and a fifth set of the plurality of stator laminates may include the plurality of coolant openings including a plurality of axial openings that extend parallel to a center axis of the stator core. Each of the plurality of axial openings may align with a respective arc end of a respective one of the plurality of generally circumferentially extending slots. The plurality of generally circumferentially extending slots may define circumferential channel segments that provide circumferential coolant flow in the stator core, and the plurality of axial openings may define axial channel segments that provide axial coolant flow between the circumferential channel segments in the stator core.

The plurality of generally circumferentially extending slots may have a first circumferential dimension and the plurality of axial openings may have a second circumferential dimension that is smaller than the first circumferential dimension. Additionally, the plurality of circumferentially extending slots may combine to define at least one circumferential cooling channel extending completely around the stator core, and the plurality of circumferential channel segments may combine to define a plurality of interconnected circumferential cooling channels extending completely around the stator core.

According to another embodiment, an electric motor includes a stator assembly, a motor rotor and a motor case. The stator assembly includes a plurality of stacked annular stator laminates defining a stator core having an inner circumference, an outer circumference, a plurality of stator teeth on the inner circumference, and a plurality of ears extending outward from the outer circumference with a respective bolt hole defined in each of the plurality of ears. A first set of the plurality of stator laminates includes a plurality of coolant openings therethrough, wherein the plurality of coolant openings of adjacent stator laminates communicate with one another in order to define cooling channels inside the stator core. A second set of the plurality of stator laminates each include one or more generally radially extending first openings therethrough, wherein the first openings of adjacent stator laminates communicate with one another to define one or more first radial channel segments inside the stator core for providing radial coolant flow between one or more of the bolt holes and one or more of the cooling channels. Each of the one or more first radial channel segments has a respective first end in fluid communication with a respective one of the bolt holes and a respective second end in fluid communication with a respective one of the cooling channels. The stator assembly further includes a network of coil windings disposed around the stator teeth. The motor rotor is rotatably mounted within the stator assembly, and the motor case has an interior and a plurality of mounting bosses within the interior, wherein each of the plurality of mounting bosses has a respective threaded hole therein and is configured to receive a respective one of the plurality of ears thereon.

The motor case may have a respective internal coolant channel therewithin proximate at least one of the mounting bosses, wherein each of the at least one of the mounting bosses has a respective counterbore formed therein about the respective threaded hole, and wherein each respective counterbore is in fluid communication with the respective internal coolant channel.

The electric motor may further include one or more bolts, wherein each of the one or more bolts is configured to extend through a respective one of the bolt holes. A respective spacing may be provided between a respective bolt shank of each of the one or more bolts and a respective inner surface of the respective one of the bolt holes, thereby defining a respective tubular-shaped axial distribution channel about each of the one or more bolts when inserted into the respective one of the bolt holes.

A third set of the plurality of stator laminates may include one or more generally radially extending second openings which define one or more second radial channel segments for providing coolant flow between an outer edge of one of the plurality of ears and the respective bolt hole defined in the ear. The plurality of stator laminates may include a first stator laminate at a first end face of the stator core and a last stator laminate at a second end face of the stator core opposed to the first end face, wherein at least one of the first and last stator laminates has a respective orifice opening therethrough in fluid communication with at least one of the bolt holes or with one of the cooling channels.

A fourth set of the plurality of stator laminates may include the plurality of coolant openings including a plurality of generally circumferentially extending slots, and a fifth set of the plurality of stator laminates may include the plurality of coolant openings including a plurality of axial openings that extend parallel to a center axis of the stator core, wherein each of the plurality of axial openings align with a respective arc end of a respective one of the plurality of generally circumferentially extending slots. The plurality of generally circumferentially extending slots may define circumferential channel segments that provide circumferential coolant flow in the stator core, and the plurality of axial openings may define axial channel segments that provide axial coolant flow between the circumferential channel segments in the stator core. The plurality of circumferential channel segments may combine to define a plurality of interconnected circumferential cooling channels extending completely around the stator core.

According to yet another embodiment, a method of manufacturing a motor stator includes: (i) stamping a plurality of annular stator laminates each having an inner circumference, an outer circumference, a plurality of stator teeth on the inner circumference and a plurality of ears extending outward from the outer circumference with a respective bolt hole defined in each of the plurality of ears, wherein a first set of the plurality of stator laminates include a plurality of coolant openings therethrough and a second set of the plurality of stator laminates each include one or more generally radially extending first openings therethrough; and (ii) stacking the plurality of annular stator laminates to define a stator core, wherein the plurality of coolant openings of adjacent stator laminates communicate with one another in order to define cooling channels inside the stator core, and wherein the first openings of adjacent stator laminates communicate with one another to define one or more first radial channel segments inside the stator core for providing radial coolant flow between one or more of the bolt holes and one or more of the cooling channels.

The method may also include stamping one or more generally radially extending second openings in a third set of the plurality of stator laminates, wherein the one or more generally radially extending second openings define one or more second radial channel segments for providing coolant flow between an outer edge of one of the plurality of ears and the respective bolt hole defined in the ear. The method may further include, stamping a respective orifice opening through at least one of a first stator laminate configured for placement at a first end face of the stator core and a last stator laminate configured for placement at a second end face of the stator core opposed to the first end face, wherein each respective orifice opening is in fluid communication with at least one of the bolt holes or with one of the cooling channels.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 4 is a schematic view of an alternative exemplary cooling channel configuration.

FIG. 5 is a schematic view of a further alternative exemplary cooling channel configuration.

FIG. 6 is a schematic plan view of an ear of a stator laminate having a generally radial first opening/channel segment.

FIG. 7 is a schematic plan view of an ear of a stator laminate having a generally radial second opening/channel segment.

FIG. 8 is a schematic cross-sectional view of a motor case before a stator core is installed therein.

DETAILED DESCRIPTION

Figure 1:
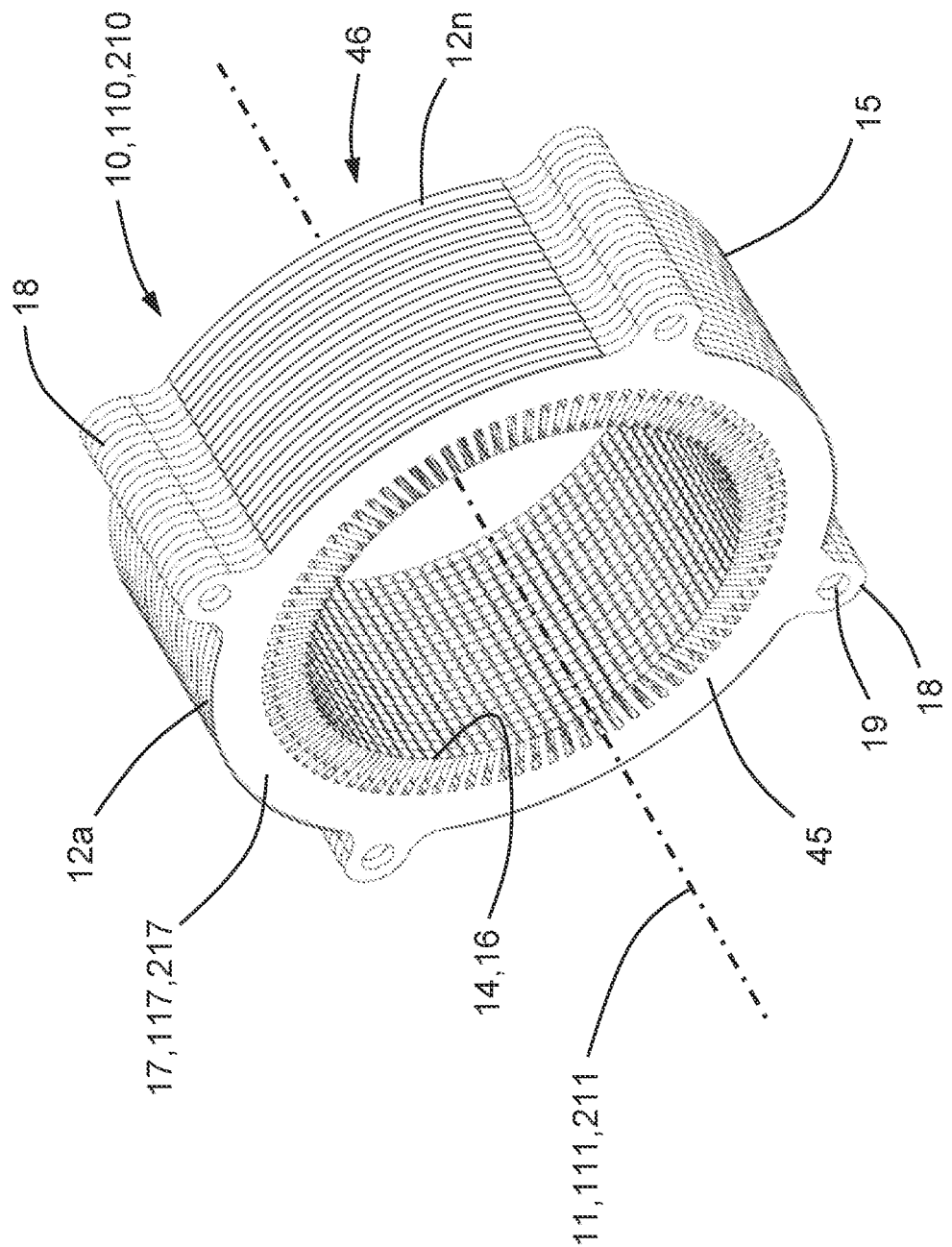
FIG. 1 is a perspective view of a stator core.

Referring now to the drawings, wherein like numerals indicate like parts in the several views, a motor stator 10, an electric motor 100 including a motor stator 10, and a method 300 for making the motor stator 10 are shown and described herein. Note that as used herein, the terms "motor stator" and "stator core" may be used interchangeably.

With reference to FIGS. 1-12, a stator core 10 according to the present disclosure is shown. The stator core 10 is made up of a plurality of groupings 12a, 12b, 12c, 12d . . . 12n of individual stamped laminates 12 formed from sheet steel. In particular, each grouping 12a, 12b, 12c, 12d . . . 12n of stamped laminates 12 can include a predetermined number of stamped laminates 12 in order to provide a desired thickness to the grouping 12a, 12b, 12c, 12d . . . 12n. Without being limited by the particular example, each of the stamped laminates 12 can be between 0.2 and 0.5 mm thick. Accordingly, in a grouping of, for example, ten (10) stamped laminates 12, the groupings 12a, 12b, 12c, 12d . . . 12n can have a thickness of between 2 and 5 mm dependent upon the thickness of the laminates 12 used. In the example shown, twenty (20) groupings of laminates 12 are shown so that, for example, with 10 laminates in each grouping 12a, 12b, 12c, 12d . . . 12n the stator core 10 would include 200 individual laminates 12. It should be understood that because the individual laminates 12 making up each grouping are very thin, for illustrative purposes, the individual laminates 12 of each grouping 12a, 12b, 12c, 12d . . . 12n are not individually shown. The stator core 10 includes all of the individual laminates 12 of each grouping 12a, 12b, 12c, 12d . . . 12n being secured together in the stacked arrangement as illustrated in FIG. 1. The individual laminates 12 can be secured together by adhesive bonding, welding, clamping, or other techniques.

According to one embodiment, the stator core 10 is defined by a plurality of stacked annular stator laminates 12, with the stator core 10 having an inner circumference 14, an outer circumference 15, a plurality of stator teeth 16 on the inner circumference 14, a back-iron portion 17 on the outer circumference 15, and a plurality of ears 18 extending outward from the outer circumference 15. A respective bolt hole 19 is defined in each of the ears 18. A first set 91 of the plurality of stator laminates 12 include a plurality of coolant openings 20 therethrough, wherein the coolant openings 20 of adjacent stator laminates 12 communicate with one another in order to define cooling channels 22 inside the stator core 10. Additionally, a second set 92 of the plurality of stator laminates 12 each include one or more generally radially extending first openings 24 therethrough, wherein the first openings 24 of adjacent stator laminates 12 communicate with one another to define one or more first radial channel segments 26 inside the stator core 10 for providing radial coolant flow between one or more of the bolt holes 19 and one or more of the cooling channels 22.

Figure 3:
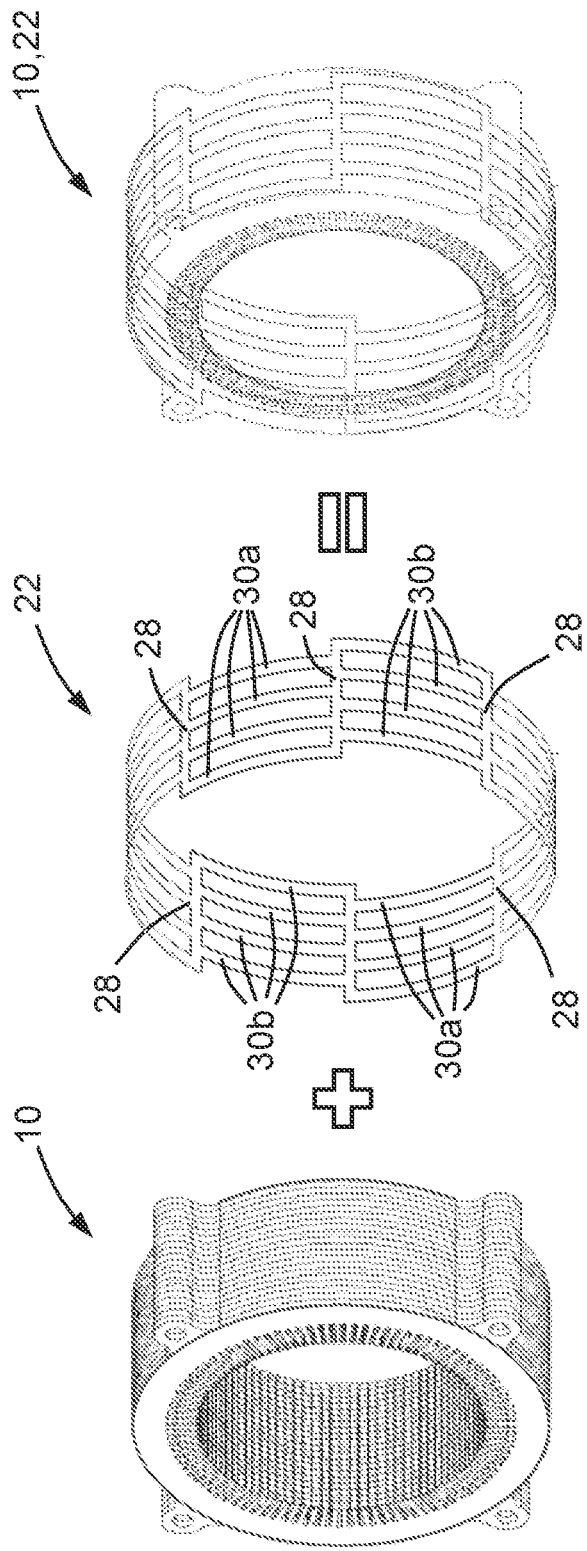
FIG. 3 is a schematic view of an exemplary cooling channel configuration.

The different groupings of laminates 12a, 12b, 12c, 12d . . . 12n are specifically designed to define the cooling channels 22 within the back-iron 17 of the stator core 10. With reference to FIG. 3, a schematic view of exemplary cooling channels 22 that can be formed within the back-iron portion 17 of the stator core 10 are shown. As shown in FIG. 3, the cooling channels 22 are schematically shown with the stator core 10 in phantom, wherein the cooling channels 22 extend generally circumferentially around the entire stator core 10.

The cooling channels 22 can optionally include a plurality of axial channel segments 28 and a plurality of circumferential channel segments 30a, 30b that extend generally circumferentially about a center axis 11 of the stator core 10. By "generally circumferentially," it is meant that the channel segments and slots can extend in a circumferential direction without requiring them to be disposed completely along a circumferential arc. By way of example, the circumferential channel segments 30a, 30b can be formed by straight, curved, or crooked channel segments that extend in a generally circumferential direction. The plurality of circumferential channel segments 30a can be axially offset from the plurality of circumferential channel segments 30b and they can be fluidly connected by the axial channel segments 28. The number of parallel circumferential channel segments 30a, 30b can be dependent upon the number of groupings of laminates 12a, 12b, 12c, 12d . . . 12n as well as the desired cooling that is needed for the motor stator 10. Accordingly, the cooling channels 22 define a cooling fluid path that extends circumferentially through the stator core 10 with interconnected circumferential channel segments 30a, 30b which may optionally extend around the entire circumference of the stator core 10.

The cooling channels 22 can take on other forms as illustrated in FIGS. 4 and 5. As shown in FIG. 4, a single serpentine cooling channel 122 is formed that extends circumferentially through the back-iron 117 of the stator core 110. The serpentine cooling channel 122 includes a plurality of axial channel segments 128 and a plurality of circumferential channel segments 130a, 130b that extend generally circumferentially about a center axis 111 of the stator core 110. The plurality of circumferential channel segments 130a can be axially offset and circumferentially offset from the plurality of circumferential channel segments 130b and they may be fluidly connected by the axial channel segments 128 in order to define a continuous serpentine cooling channel 122, which may optionally extend around the entire circumference of the stator core 10.

As shown in FIG. 5, a plurality of separate serpentine cooling channels 222 are formed that extend circumferentially through the back-iron 217 of the stator core 210. Each of the serpentine cooling channels 222 includes a plurality of axial channel segments 228 and a plurality of circumferential channel segments 230a, 230b that extend generally circumferentially about a center axis 211 of the stator core 210. The plurality of circumferential channel segments 230a can be axially offset and circumferentially offset from the plurality of circumferential channel segments 230b and they may be fluidly connected by the axial channel segments 228 in order to define each of the continuous serpentine cooling channels 222, which may optionally extend around the entire circumference of the stator core 10.

Figure 2:
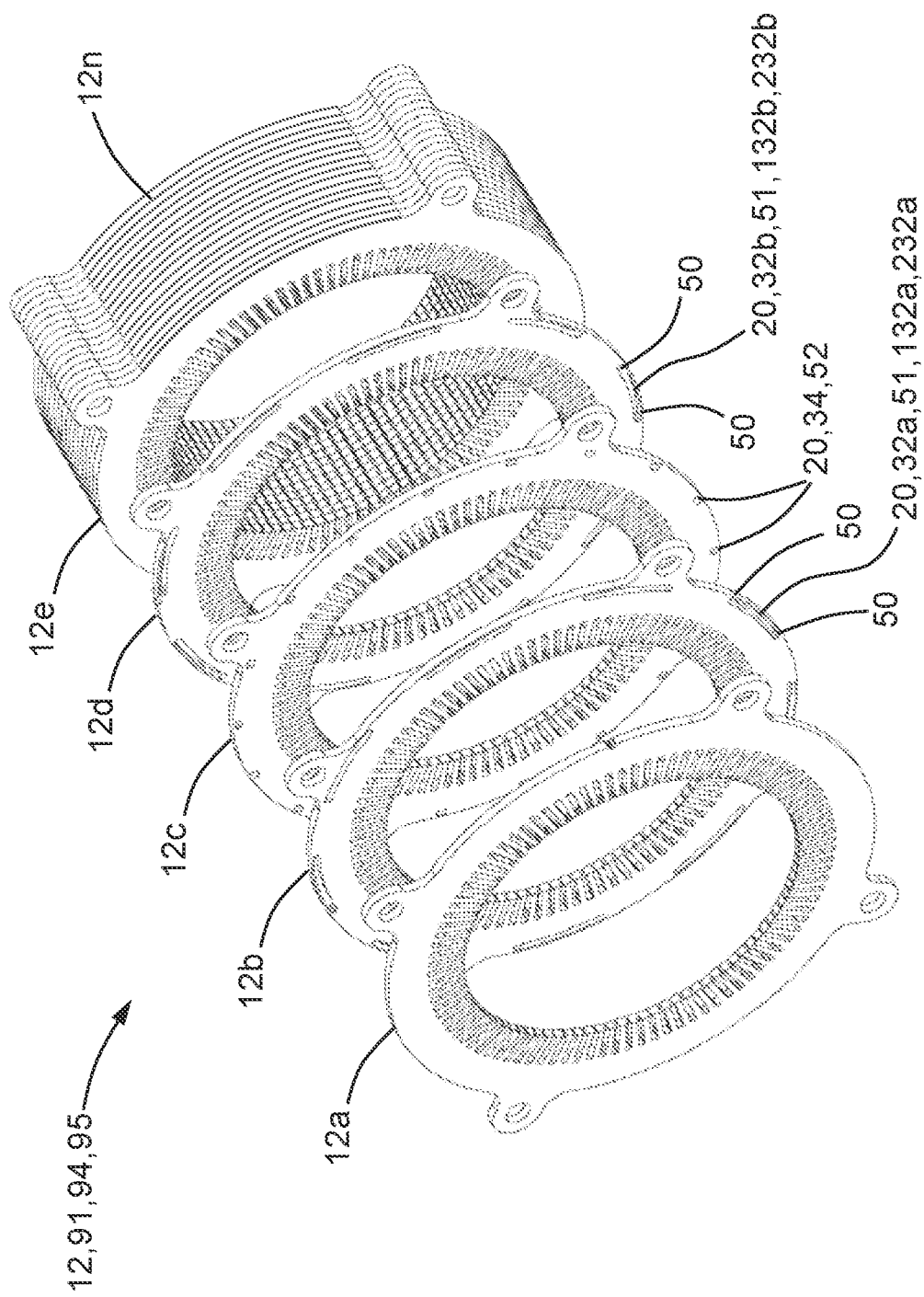
FIG. 2 is a partially exploded perspective view of the stator core of FIG. 1.

Referring now to FIG. 2, the laminate grouping 12b is shown including a plurality of generally circumferentially extending slots 32a extending through each laminate in the grouping 12b. The generally circumferentially extending slots 32a correspond with the plurality of circumferential channel segments 30a of the cooling channels 22 shown in FIG. 3 and are intended to have a larger dimension in the circumferential direction than in a radial direction. Each of the generally circumferentially extending slots 32a has two opposed arc ends 50. The laminate grouping 12c is shown including a plurality of openings 34 (also sometimes referred to herein as "axial openings"). The openings 34 are aligned with the arc ends 50 of the generally circumferentially extending slots 32a, 32b of neighboring laminate groupings 12b and 12d and define portions of the axial channel segments 28 of the cooling channels 22 shown in FIG. 3. Although the openings 34 can have various shapes, they are particularly designed to provide the axial channel segments 28 of the cooling channels. The laminate grouping 12d is shown including a plurality of generally circumferentially extending slots 32b extending through each laminate in the grouping 12d, with each generally circumferentially extending slot 32b having two opposed arc ends 50. The generally circumferentially extending slots 32b are circumferentially offset from the generally circumferentially extending slots 32a of the laminate grouping 12b and correspond with the plurality of circumferential channel segments 30b of the cooling channels 22 shown in FIG. 3. The laminate grouping 12e may be the same as laminate grouping 12c and may include openings 34 that also define portions of the axial channel segments 28 of the cooling channels 22, or laminate grouping 12e may be the same as laminate grouping 12a and have no openings, slots or channels therein.

Figure 10:
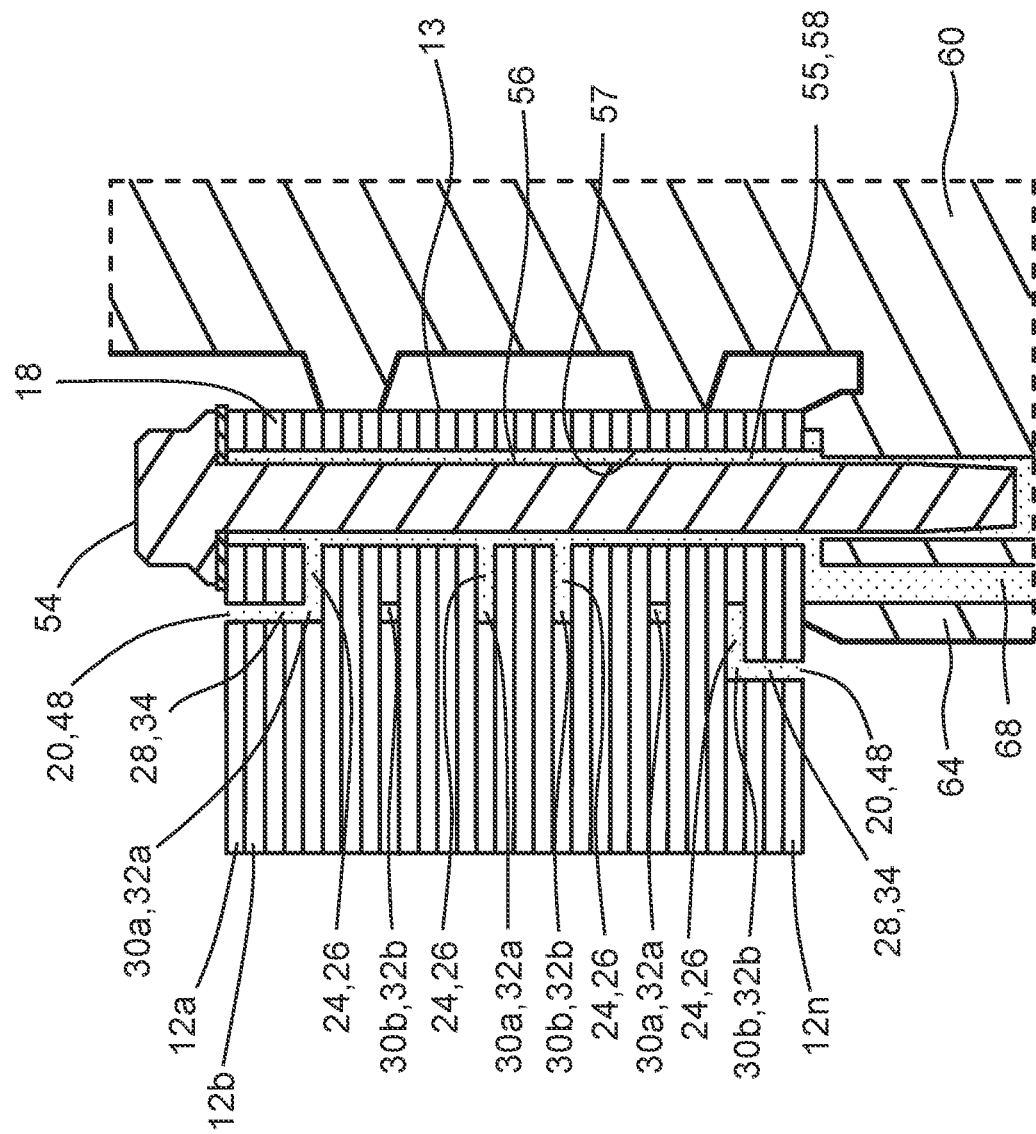
FIG. 10 is a schematic cross-sectional view of a motor case and a stator core having another configuration of cooling channels therein.

Accordingly, by repeating the layering of the laminate groupings 12b, 12c, 12d, 12e the cooling channel arrangement of FIG. 3 is created. It should be recognized that by incorporating the laminate groupings 12b, 12c, 12d, 12e in different ways, the cooling channels 122 and 222 as shown in FIGS. 4 and 5 can also be easily constructed, as well as other modified shapes. In particular, the laminate groupings 12b, 12d can be used to form the circumferential channel segments 130a, 230a; 130b, 230b, respectively, and the laminate grouping 12c can be used to form portions of the axial channel segments 128, 228. As shown in FIGS. 1-3, the end laminate groupings 12a, 12n can be formed without the generally circumferentially extending slots 32a or the openings 34 as utilized in the laminate groupings 12b, 12c, 12d in order to isolate the cooling channels 22, 122, 222 within the stator core 10. However, it should be understood that the end laminate groupings 12a, 12n can be eliminated or provided with other desired openings (e.g., orifice openings 48 as shown in FIG. 10) to allow a desired leak out of the coolant over the coil windings 80 of the stator 10.

As noted above, a first set 91 of stator laminates 12 include a plurality of coolant openings 20 therethrough. For example, the coolant openings 20 may take the form of axial openings 34 and/or circumferential slots 32a, 32b, and the first set 91 of laminates 12 which bear these coolant openings 20 may be laminate groupings 12b, 12c and 12d (and repeated instances of these groupings). As illustrated in FIG. 6, each of the laminates 12 in the second set 92 includes at least one generally radially extending first opening 24 therethrough. In FIG. 6, the first radial opening 24 cooperates with adjacent stator laminates 12 to define a first radial channel segment 26 for providing radial coolant flow between the bolt hole 19 and a cooling channel 22 (in the form of an axial channel segment/opening 28, 34). Each first radial channel segment 26 may have a first end 36 in fluid communication with one of the bolt holes 19 and a second end 38 in fluid communication with one of the cooling channels 22. As shown in FIG. 7, a third set 93 of stator laminates 12 may include one or more generally radially extending second openings 40 which define one or more second radial channel segments 42 for providing coolant flow between an outer edge or surface 13 of one of the ears 18 and the respective bolt hole 19 defined in the ear 18. A third end 43 of each second radial channel segment 42 may be in fluid communication with the outer edge or surface 13 of the ear 18, and a fourth end 44 of each second radial channel segment 42 may be in fluid communication with the bolt hole 19.

The plurality of stator laminates 12 may include a first stator laminate or laminate grouping 12a at a first end face 45 of the stator core 10 and a last stator laminate or laminate grouping 12n at a second end face 46 of the stator core 10 opposed to the first end face 45. As illustrated by FIG. 10, at least one of the first and last stator laminates or laminate groupings 12a, 12n may have a respective orifice opening 48 therethrough in direct or indirect fluid communication with at least one of the bolt holes 19 or with one of the cooling channels 22.

A fourth set 94 of the plurality of stator laminates 12 may include the plurality of coolant openings 20 including or defining the plurality of generally circumferentially extending slots 32a, 32b, and a fifth set 95 of the plurality of stator laminates 12 may include the plurality of coolant openings 20 including or defining the plurality of axial openings 34 that extend parallel to the center axis 11 of the stator core 10. (In other words, the laminates 12 and laminate groupings of the first set 91 may be broken down into and comprise the fourth and fifth sets 94, 95 of laminates 12 and laminate groupings.) Each of the plurality of axial openings 34 may align with a respective arc end 50 of a respective one of the plurality of generally circumferentially extending slots 32a, 32b. The plurality of generally circumferentially extending slots 32a, 32b may define the circumferential channel segments 30a, 30b that provide circumferential coolant flow in the stator core 10, and the plurality of axial openings 34 may define the axial channel segments 28 that provide axial coolant flow between the circumferential channel segments 30a, 30b in the stator core 10.

The plurality of generally circumferentially extending slots 32a, 32b may each have a first circumferential dimension 51 (i.e., an arc length) and the plurality of axial openings 34 may each have a second circumferential dimension 52 (i.e., a width as measured circumferentially) that is smaller than the first circumferential dimension 51. Additionally, as illustrated in FIGS. 4-5, the plurality of circumferentially extending slots 32a, 32b, 132a, 132b, 232a, 232b may combine to define at least one circumferential cooling channel 22, 122, 222 extending completely around the stator core 10, and the plurality of circumferential channel segments 30a, 30b, 130a, 130b, 230a, 230b may combine to define a plurality of interconnected circumferential cooling channels 22, 122, 222 extending completely around the stator core 10.

Figure 9:
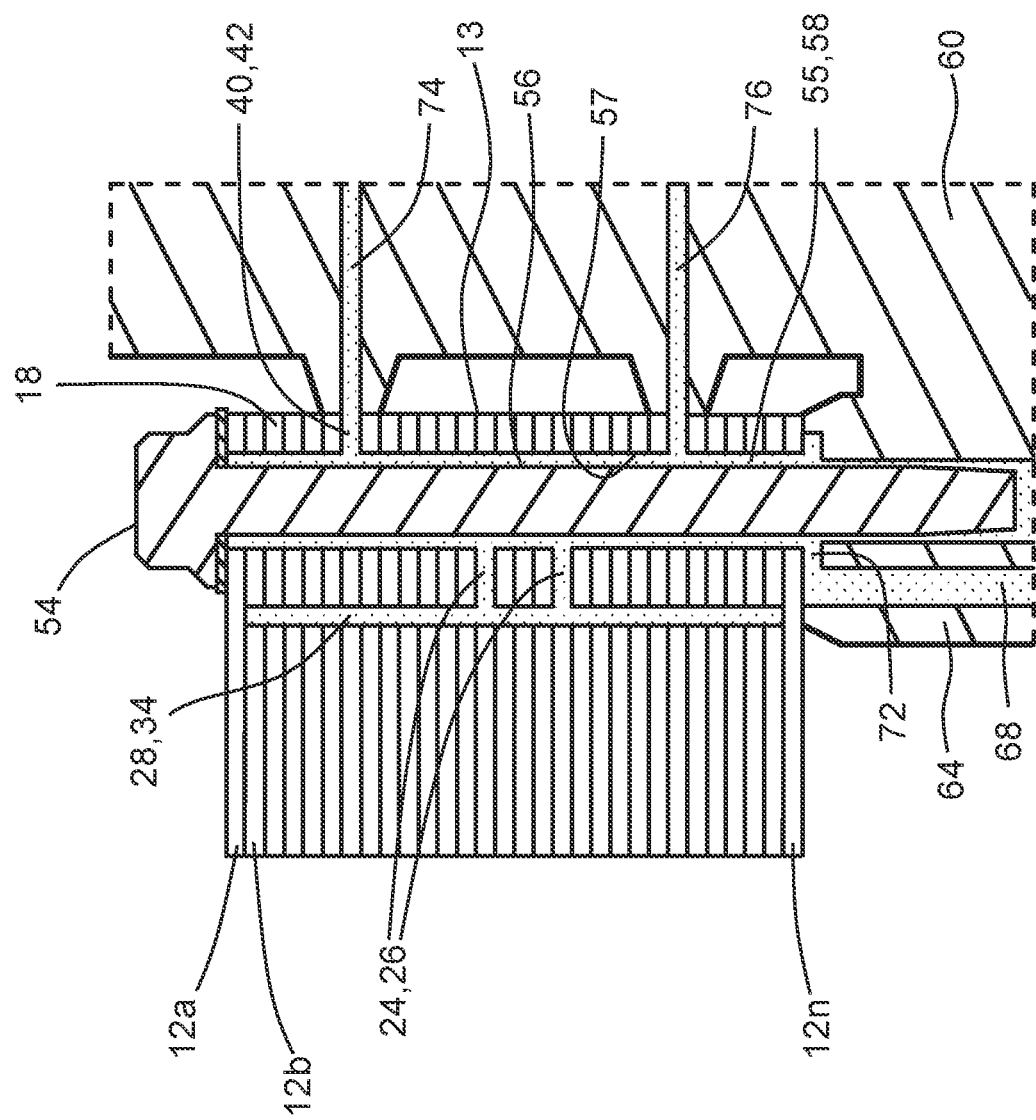
FIG. 9 is a schematic cross-sectional view of a motor case and a stator core having one configuration of cooling channels therein.

As illustrated in FIGS. 8-10, the stator core 10 may also include one or more bolts 54, wherein each of the one or more bolts 54 is configured to extend through a respective one of the bolt holes 19. A respective spacing 55 may be provided between a respective bolt shank 56 of each of the one or more bolts 54 and a respective inner surface 57 of the respective one of the bolt holes 19, thereby defining a respective tubular-shaped axial distribution channel 58 about each of the one or more bolts 54 when inserted into the respective one of the bolt holes 19.

The motor stator 10 may additionally include a motor case 60 having an interior 62 and a plurality of mounting bosses 64 within the interior 62. Each mounting boss 64 may have a respective threaded hole 66 therein and may be configured to receive or interface with a respective one of the ears 18. The motor case 60 may have a respective internal coolant channel 68 therewithin proximate one of the mounting bosses 64, with each mounting boss 64 having a respective counterbore 70 formed therein about or around the threaded hole 66. The counterbore 70 may be in fluid communication with the nearby internal coolant channel 68, such as by a bridging channel 72 therebetween. The motor case 60 also have one or more coolant ports defined therein, such as the first and second coolant ports 74, 76 and their respective coolant feed bosses 61 as shown in FIGS. 8-9.

Figure 12:
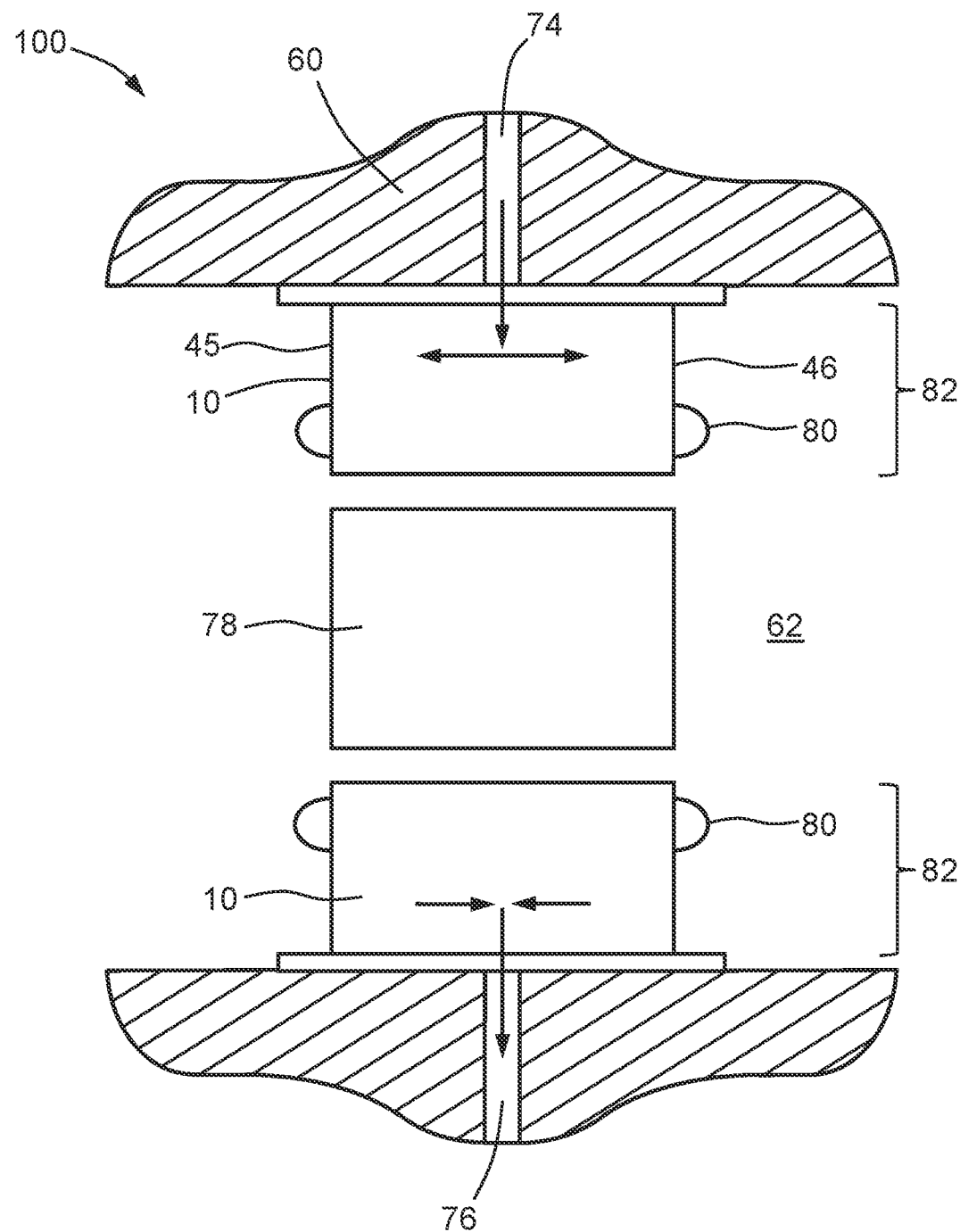
FIG. 12 is a schematic view of an electric motor having a stator, a rotor and a motor case.

As noted above, the stator laminates 12 are provided in groupings and are all secured together in a stack that defines the stator core 10. As shown in FIG. 12, the stator core 10 is shown implemented in an electric motor 100 having a motor case or housing 60 including first and second coolant ports 74, 76 in communication with the stator core 10. Both of the coolant ports 74, 76 may be coolant inlets which feed coolant into the stator core 10 (e.g., into the second radial openings 40 and thence into the bolt holes 19 or axial distribution channels 58), or one may be a coolant inlet with the other being a coolant outlet. A rotor 78 is rotatably mounted within the stator core 10. The stator core 10 may have a plurality of coil windings 80 disposed around the stator teeth 16, thereby defining a stator assembly 82.

Considering FIGS. 7, 8 and 12 together, it may be seen that the first coolant port 74 may feed coolant into one ear 18 located on one side of the stator core 10, and the second coolant port 76 may receive coolant from another ear 18 located on another side of the stator core 10. For example, the first coolant port 74 (and its coolant feed boss 61) and one ear 18 may be located at the "top" of the motor case interior 62, and the second coolant port 76 (and its coolant feed boss 61) and another ear 18 may be located at the "bottom" of the motor case interior 62 approximately 180 degrees away from the "top" rotationally speaking. The coolant may enter the "top" ear 18 via one or more respective second openings/second radial cooling segments 40, 42 and may then flow into the "top" bolt hole or axial distribution channel 19, 58. The coolant may then flow throughout the stator core 10, and may exit through the "bottom" bolt hole or axial distribution channel 19, 58 via one or more respective second openings/second radial cooling segments 40, 42 in the "bottom" ear 18. In this "closed" type of arrangement, the coolant may be continuously recirculated through the stator core 10 after passing through a cooling system or heat exchanger (not shown), or the coolant may be passed on to cool and/or lubricate gears, bearings or other mechanisms or systems that are "downstream" of the stator core 10 flow-wise.

According to another embodiment, an electric motor 100 includes a stator assembly 82, a rotor 78 and a motor case or housing 60. The stator assembly 82 includes a plurality of stacked annular stator laminates 12 defining a stator core 10 having an inner circumference 14, an outer circumference 15, a plurality of stator teeth 16 on the inner circumference, and a plurality of ears 18 extending outward from the outer circumference 15 with a respective bolt hole 19 defined in each of the plurality of ears 18. A first set 91 of the plurality of stator laminates 12 includes a plurality of coolant openings 20 therethrough, wherein the plurality of coolant openings 20 of adjacent stator laminates 12 communicate with one another in order to define cooling channels 22 inside the stator core 10. A second set 92 of the plurality of stator laminates 12 each include one or more generally radially extending first openings 24 therethrough, wherein the first openings 24 of adjacent stator laminates 12 communicate with one another to define one or more first radial channel segments 26 inside the stator core 10 for providing radial coolant flow between one or more of the bolt holes 19 and one or more of the cooling channels 22. Each of the one or more first radial channel segments 26 has a respective first end 36 in fluid communication with a respective one of the bolt holes 19 and a respective second end 38 in fluid communication with a respective one of the cooling channels 22. The stator assembly 82 further includes a network of coil windings 80 disposed around the stator teeth 16. The rotor 78 is rotatably mounted within the stator assembly 82, and the motor case 60 has an interior 62 and a plurality of mounting bosses 64 within the interior 62, wherein each of the mounting bosses 64 has a respective threaded hole 66 therein and is configured to mountably receive a respective one of the ears 18 thereon.

The motor case 60 may have a respective internal coolant channel 68 therewithin proximate at least one of the mounting bosses 64, wherein each of the at least one of the mounting bosses 64 has a respective counterbore 70 formed therein about the respective threaded hole 66, and wherein each respective counterbore 70 is in fluid communication with the respective internal coolant channel 68.

The electric motor 100 may further include one or more bolts 54, wherein each of the one or more bolts 54 is configured to extend through a respective one of the bolt holes 19. A respective spacing 55 may be provided between a respective bolt shank 56 of each of the one or more bolts 54 and a respective inner surface 57 of the respective one of the bolt holes 19, thereby defining a respective tubular-shaped axial distribution channel 58 about each of the one or more bolts 54 when inserted into the respective one of the bolt holes 19.

A third set 93 of the plurality of stator laminates 12 may include one or more generally radially extending second openings 40 which define one or more second radial channel segments 42 for providing coolant flow between an outer edge 13 of one of the plurality of ears 18 and the respective bolt hole 19 defined in the ear 18. The plurality of stator laminates 12 may include a first stator laminate 12a at a first end face 45 of the stator core 10 and a last stator laminate 12n at a second end face 46 of the stator core 10 opposed to the first end face 45, wherein at least one of the first and last stator laminates 12a, 12n has a respective orifice opening 48 therethrough in fluid communication with at least one of the bolt holes 19 or with one of the cooling channels 22.

A fourth set 94 of the plurality of stator laminates 12 may include the plurality of coolant openings 20 including or defining a plurality of generally circumferentially extending slots 32a, 32b, and a fifth set 95 of the plurality of stator laminates 12 may include the plurality of coolant openings 20 including or defining a plurality of axial openings 34 that extend parallel to a center axis 11 of the stator core 10, wherein each of the plurality of axial openings 34 align with a respective arc end 50 of a respective one of the plurality of generally circumferentially extending slots 32a, 32b. The plurality of generally circumferentially extending slots 32a, 32b may define circumferential channel segments 30a, 30b that provide circumferential coolant flow in the stator core 10, and the plurality of axial openings 34 may define axial channel segments 28 that provide axial coolant flow between the circumferential channel segments 30a, 30b in the stator core 10. As shown in FIGS. 3-5, the plurality of circumferential channel segments 30a, 30b may combine to define a plurality of interconnected circumferential cooling channels 22, 122, 222 extending completely around the stator core 10.

Figure 11:
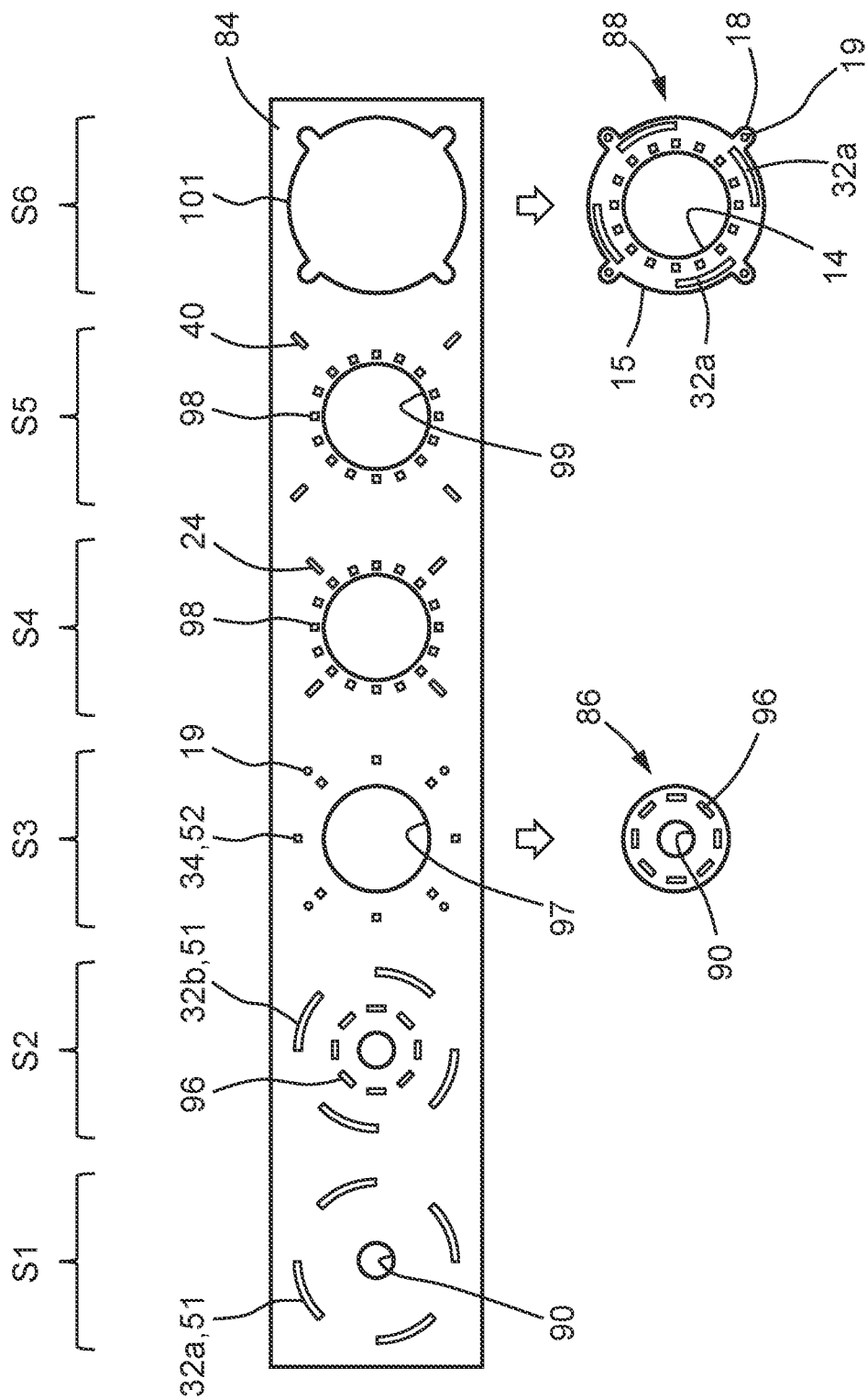
FIG. 11 is a schematic view of an exemplary stamping sequence for making stator laminates.

With reference to FIG. 11, an exemplary laminate stamping process used for making laminates similar to the laminates 12 used in laminate grouping 12b will be described. As shown in FIG. 11, a portion of a continuous roll of sheet steel 84 is shown, wherein both rotor laminates 86 and the stator laminates 88 can be punched. The stamping process can utilize various stamping stages that can be turned on or turned off depending upon desired configuration of the laminate being stamped. As shown at stage S1 a plurality of circumferential slots 32a can be formed when the punch stage S1 is activated to form laminates for the laminate grouping 12b. In addition to the optional punching for the circumferential slots 32a, stage S1 can include punching the inner diameter hole 90 for the rotor laminate 86.

Stage S2 shows the optional punching of circumferential slots 32b that can be activated to form laminates 12 for the laminate grouping 12d. In addition to the optional punching for the circumferential slots 32b, stage S2 can include punching the circumferential slots 96 for the rotor laminate 86.

Stage S3 shows the optional punching of axial openings 34 that can be activated to form laminates for the laminate grouping 12c. Additionally, the bolt holes 19 may be punched for each stator laminate 88. Further, stage S3 can also include punching a hole 97 to release the rotor laminate 86 from the metal sheet 84.

Stage S4 shows the optional punching of the generally radially extending first openings 24 for selected stator laminates 88. This stage can also include punching the holes 98 for forming the stator teeth 16.

Stage S5 shows punching a hole 99 to form the inner circumferential edge 14 of the stator laminates 88 in order to complete the forming of the stator teeth 16. This stage may optionally also include a second punching of the holes 98 for forming the stator teeth 16, and also may include punching of the generally radially extending second openings 40 for selected stator laminates 88. Note that the diameter of the hole 99 may be slightly larger than the hole 97. Stage S5 may also include punching the bolt holes 19.

Stage S6 shows punching a final hole 101 to form the outer circumferential edge 15 and ears 18 and to release the stator laminates 88 from the sheet 84. It should be understood that the finished stator laminate 88 shown in FIG. 11 includes the circumferential slots 32a from stage 51 while the remaining optional portions of stages S2-S4 are deactivated so that the circumferential slots 32b, the axial openings 34, the generally radially extending first and second openings 24, 40, etc. are not provided in the exemplary stator laminate 88, as shown. By activating different ones of the optional punching stages, the different types of stator laminates can be formed in a continuous manufacturing process.

The set of stator laminates 88, when assembled, will create circumferential, axial and radial cooling channels 22 inside the stator core 10 with openings as desired to allow coolant to enter and exit the stator core 10. The unique geometry can be incorporated into existing progressive die stages by turning the special punches on/off during stamping sequences so that a complete set of stator laminates 88 and rotor laminates 86 can be consecutively produced in a desired order to completely form all of the stator laminates 12 of a stator core 10. The cooling channels 22 can be designed to consist of a single path or multiple paths with interconnected and/or unconnected channels 22.

Figure 13:
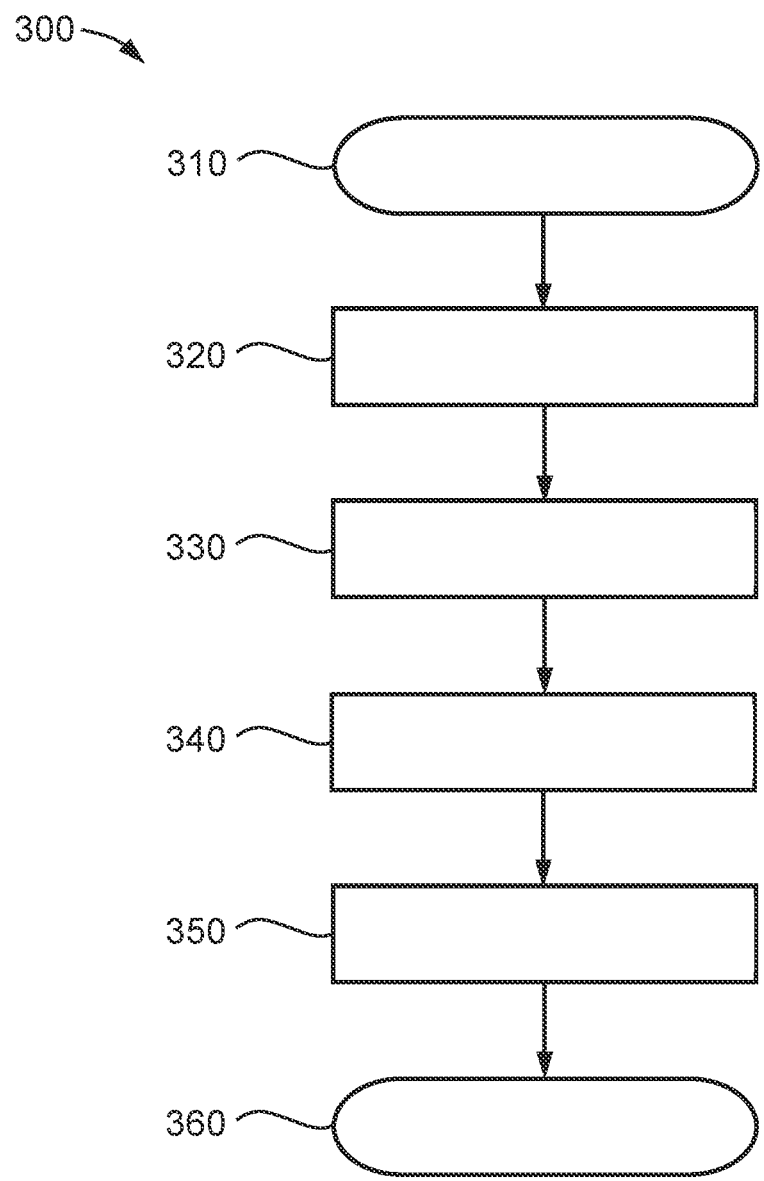
FIG. 13 is a flowchart for a method of manufacturing a stator core.

FIG. 13 shows a flowchart for a method 300 of manufacturing a motor stator or stator core 10. The method 300 starts at block 310, and includes, at block 320, stamping a plurality of annular stator laminates 12 each having an inner circumference 14, an outer circumference 15, a plurality of stator teeth 16 on the inner circumference 14 and a plurality of ears 18 extending outward from the outer circumference 15 with a respective bolt hole 19 defined in each of the plurality of ears 18, wherein a first set 91 of the plurality of stator laminates 12 include a plurality of coolant openings 20 therethrough and a second set 92 of the plurality of stator laminates 12 each include one or more generally radially extending first openings 24 therethrough. The method 300 additionally includes, at block 350, stacking the plurality of annular stator laminates 12 to define a stator core 10, wherein the plurality of coolant openings 20 of adjacent stator laminates 12 communicate with one another in order to define cooling channels 22 inside the stator core 10, and wherein the first openings 24 of adjacent stator laminates 12 communicate with one another to define one or more first radial channel segments 26 inside the stator core 10 for providing radial coolant flow between one or more of the bolt holes 19 and one or more of the cooling channels 22.

The method 300 may also include, at block 330, stamping one or more generally radially extending second openings 40 in a third set 93 of the plurality of stator laminates 12, wherein the one or more generally radially extending second openings 40 define one or more second radial channel segments 42 for providing coolant flow between an outer edge 13 of one of the plurality of ears 18 and the respective bolt hole 19 defined in the ear 18. The method 300 may further include, at block 340, stamping a respective orifice opening 48 through at least one of a first stator laminate 12a configured for placement at a first end face 45 of the stator core 10 and a last stator laminate 12n configured for placement at a second end face 46 of the stator core 10 opposed to the first end face 45, wherein each respective orifice opening 48 is in fluid communication with at least one of the bolt holes 19 or with one of the cooling channels 22. Finally, at block 360, the method 300 ends.

It may be noted that each of the first through fifth sets 91, 92, 93, 94, 95 includes one or more individual stator laminates 12 therein. Also, it may be noted that for some configurations, two or more of these sets may overlap each other (in terms of which individual laminates 12 are included in each set), and/or two or more of these sets may be identical to each other (again, in terms of which individual laminates 12 are included in each set). Additionally, the laminate sets 91, 92, 93, 94, 95 and the various coolant openings 20 and cooling channels 22 may be arranged so as to bias the coolant flow towards one end or another of the stator core 10, in order to balance or direct the cooling effect of the coolant flow within the stator core 10.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A motor stator, comprising:
  a plurality of stacked annular stator laminates defining a stator core having an inner circumference, an outer circumference, a plurality of stator teeth on the inner circumference, and a plurality of ears extending outward from the outer circumference with a respective bolt hole defined in each of the plurality of ears, a first set of the plurality of stator laminates including a plurality of coolant openings therethrough, wherein the plurality of coolant openings of adjacent stator laminates communicate with one another in order to define cooling channels inside the stator core; and a motor case having an interior and a plurality of mounting bosses within the interior wherein each of the plurality of mounting bosses has a respective threaded hole therein and is configured to receive a respective one of the plurality of ears thereon, the motor case having a respective internal coolant channel therewithin proximate at least one of mounting bosses, wherein each of the at least one of the mounting bosses has a respective counterbore formed therein about the respective threaded hole, wherein each respective counterbore is in fluid communication with the respective internal coolant channel;

wherein a second set of the plurality of stator laminates each include one or more generally radially extending first openings therethrough, wherein the first openings of adjacent stator laminates communicate with one another to define one or more first radial channel segments inside the stator core for providing radial coolant flow between one or more of the bolt holes and one or more of the cooling channels.

2. The motor stator of claim 1, further comprising: one or more bolts, wherein each of the one or more bolts is configured to extend through a respective one of the bolt holes, wherein a respective spacing is provided between a respective bolt shank of each of the one or more bolts and a respective inner surface of the respective one of the bolt holes, thereby defining a respective tubular-shaped axial distribution channel about each of the one or more bolts when inserted into the respective one of the bolt holes.

3. The motor stator of claim 1, wherein a third set of the plurality of stator laminates include one or more generally radially extending second openings which define one or more second radial channel segments for providing coolant flow between an outer edge of one of the plurality of ears and the respective bolt hole defined in the ear.

4. The motor stator of claim 1, wherein the plurality of stator laminates includes a first stator laminate at a first end face of the stator core and a last stator laminate at a second end face of the stator core opposed to the first end face, wherein at least one of the first and last stator laminates has a respective orifice opening therethrough in fluid communication with at least one of the bolt holes or with one of the cooling channels.

5. The motor stator of claim 1, wherein a fourth set of the plurality of stator laminates include the plurality of coolant openings including a plurality of generally circumferentially extending slots and wherein a fifth set of the plurality of stator laminates include the plurality of coolant openings including a plurality of axial openings that extend parallel to a center axis of the stator core, wherein each of the plurality of axial openings align with a respective arc end of a respective one of the plurality of generally circumferentially extending slots; and wherein the plurality of generally circumferentially extending slots define circumferential channel segments that provide circumferential coolant flow in the stator core, and the plurality of axial openings define axial channel segments that provide axial coolant flow between the circumferential channel segments in the stator core.

6. The motor stator of claim 5, wherein the plurality of generally circumferentially extending slots have a first circumferential dimension and the plurality of axial openings have a second circumferential dimension that is smaller than the first circumferential dimension.

7. The motor stator of claim 5, wherein the plurality of circumferentially extending slots combine to define at least one circumferential cooling channel extending completely around the stator core.

8. The motor stator of claim 5, wherein the plurality of circumferential channel segments combine to define a plurality of interconnected circumferential cooling channels extending completely around the stator core.

9. The motor stator of claim 1, wherein each of the one or more first radial channel segments has a respective first end in fluid communication with a respective one of the bolt holes and a respective second end in fluid communication with a respective one of the cooling channels.

10. An electric motor, comprising:
a stator assembly including a plurality of stacked annular stator laminates defining a stator core having an inner circumference, an outer circumference, a plurality of stator teeth on the inner circumference, and a plurality of ears extending outward from the outer circumference with a respective bolt hole defined in each of the plurality of ears, a first set of the plurality of stator laminates including a plurality of coolant openings therethrough, wherein the plurality of coolant openings of adjacent stator laminates communicate with one another in order to define cooling channels inside the stator core, wherein a second set of the plurality of stator laminates each include one or more generally radially extending first openings therethrough, wherein the first openings of adjacent stator laminates communicate with one another to define one or more first radial channel segments inside the stator core for providing radial coolant flow between one or more of the bolt holes and one or more of the cooling channels, wherein each of the one or more first radial channel segments has a respective first end in fluid communication with a respective one of the bolt holes and a respective second end in fluid communication with a respective one of the cooling channels, the stator assembly further including a network of coil windings disposed around the stator teeth;

a motor rotor rotatably mounted within the stator assembly; and a motor case having an interior and a plurality of mounting bosses within the interior, wherein each of the plurality of mounting bosses has a respective threaded hole therein and is configured to receive a respective one of the plurality of ears thereon;

wherein the motor case has a respective internal coolant channel therewithin proximate at least one of the mounting bosses, wherein each of the at least one of the mounting bosses has a respective counterbore formed therein about the respective threaded hole, wherein each respective counterbore is in fluid communication with the respective internal coolant channel.

11. The electric motor of claim 10, further comprising:
one or more bolts, wherein each of the one or more bolts is configured to extend through a respective one of the bolt holes, wherein a respective spacing is provided between a respective bolt shank of each of the one or more bolts and a respective inner surface of the respective one of the bolt holes, thereby defining a respective tubular-shaped axial distribution channel about each of the one or more bolts when inserted into the respective one of the bolt holes.

12. The electric motor of claim 10, wherein a third set of the plurality of stator laminates include one or more generally radially extending second openings which define one or more second radial channel segments for providing coolant flow between an outer edge of one of the plurality of ears and the respective bolt hole defined in the ear.

13. The electric motor of claim 10, wherein the plurality of stator laminates includes a first stator laminate at a first end face of the stator core and a last stator laminate at a second end face of the stator core opposed to the first end face, wherein at least one of the first and last stator laminates has a respective orifice opening therethrough in fluid communication with at least one of the bolt holes or with one of the cooling channels.

14. The electric motor of claim 10, wherein a fourth set of the plurality of stator laminates include the plurality of coolant openings including a plurality of generally circumferentially extending slots and wherein a fifth set of the plurality of stator laminates include the plurality of coolant openings including a plurality of axial openings that extend parallel to a center axis of the stator core, wherein each of the plurality of axial openings align with a respective arc end of a respective one of the plurality of generally circumferentially extending slots; and wherein the plurality of generally circumferentially extending slots define circumferential channel segments that provide circumferential coolant flow in the stator core, and the plurality of axial openings define axial channel segments that provide axial coolant flow between the circumferential channel segments in the stator core.

15. The electric motor of claim 10, wherein the plurality of circumferential channel segments combine to define a plurality of interconnected circumferential cooling channels extending completely around the stator core.

16. D) A method of manufacturing a motor stator, comprising:

stamping a plurality of annular stator laminates each having an inner circumference, an outer circumference, a plurality of stator teeth on the inner circumference and a plurality of ears extending outward from the outer circumference with a respective bolt hole defined in each of the plurality of ears, wherein a first set of the plurality of stator laminates include a plurality of coolant openings therethrough and a second set of the plurality of stator laminates each include one or more generally radially extending first openings therethrough;

stacking the plurality of annular stator laminates to define a stator core, wherein the plurality of coolant openings of adjacent stator laminates communicate with one another in order to define cooling channels inside the stator core, and wherein the first openings of adjacent stator laminates communicate with one another to define one or more first radial channel segments inside the stator core for providing radial coolant flow between one or more of the bolt holes and one or more of the cooling channels, and disposing the stator core within a motor case having an interior and a plurality of mounting bosses within the interior, wherein each of the plurality of mounting bosses as a respective threaded hole therein and is configured to receive a respective one of the plurality of ears thereon, the motor case having a respective internal coolant channel therewithin proximate at least one of the mounting bosses, wherein each of the at least one of the mounting bosses has a respective counterbore formed therein about the respective threaded hole, wherein each respective counterbore is in fluid communication with the respective internal coolant channel.

17. The method of claim 16, further comprising:

stamping one or more generally radially extending second openings in a third set of the plurality of stator laminates, wherein the one or more generally radially extending second openings define one or more second radial channel segments for providing coolant flow between an outer edge of one of the plurality of ears and the respective bolt hole defined in the ear.

18. The method of claim 16, further comprising:

stamping a respective orifice opening through at least one of a first stator laminate configured for placement at a first end face of the stator core and a last stator laminate configured for placement at a second end face of the stator core opposed to the first end face, wherein each respective orifice opening is in fluid communication with at least one of the bolt holes or with one of the cooling channels.

* * * * *